3,240,839
PROCESS FOR THE PRODUCTION OF METHYL
BUTENE AND METHYL PENTENE
Kurt Zosel, Oberhausen, Germany, assignor to Studiengesellschaft Kohle m.b.H., Mulheim an der Ruhr, Germany
No Drawing. Filed Sept. 12, 1962, Ser. No. 223,278
Claims priority, application Germany, Sept. 18, 1961,
St 18,332
7 Claims. (Cl. 260—683.15)

This invention relates to a process for the production of methyl butene and methyl pentene.

Methyl butene and methyl pentene are useful starting materials for the production of isoprene which in turn can be polymerized to form a synthetic natural rubber. Methyl butene is dehydrogenated to form isoprene while methyl pentene is converted into methane and isoprene by cracking.

Both the copolymerization of ethylene and propylene to form methyl butene and the dimerization of propylene to form methyl pentene are known on principle.

Codimerization of ethylene and propylene by means of organometallic compounds to form 2-methyl butene-(1) has been studied recently by a great number of researchers and many reports on these studies have been published.

That embodiment which is supposed to be the best at the present time has been described by K. Ziegler in "Angewandte Chemie," vol. 22 (1960), page 833.

This process permits the production of methyl butene in a yield of about 90%, based on ethylene and propylene consumed, by first reacting aluminum triethyl partially with propylene and, in a second stage, reacting the reaction product with ethylene to give pure aluminum triethyl again.

The process is technically very advantageous and can be carried out easily and smoothly. On the other hand, this process exhibits the deficiency that it is necessary for the production of, for example, 100 kg. of methyl butene to pass about 165 kg. of aluminum triethyl through two separate reactors operating under different conditions. This means a relatively high technical expense.

It has now been found that when putting up with a somewhat lower yield of methyl butene, this reaction can also be carried out in one step and, by varying the conditions, predominant formation of either methyl pentene or methyl butene or, of course, of a mixture of the two products in any ratio desired can be achieved in the same synthesis step.

This result is based on the following findings:

As described in French Patent No. 1,270,827 and U.S. application Serial No. 54,931 (U.S. Patent No. 3,180,-881), the inventor of the present application found that aluminum alkyl compounds of the formula $AlR_3$ or $R_2AlH$ or mixtures thereof with compounds of the formula $AlR_2X$ wherein X is halogen, OR or SR and R is an alkyl having at least 2 carbon atoms can be reacted with olefins particularly successfully when operating at temperatures of between 200° and 320° C. and preferably between 270° and 310° C. and residence times of 0.1 to 10 seconds and preferably 0.5 to 1 second. When using ethylene, this process is preferably effected at a pressure of at least 2 atmospheres and most preferably of 10 atmospheres. The molar ratio of olefin to aluminum alkyl ranges between 5:1 and 100:1. The order of olefins used for the displacement in the sequence of decreasing affinity to aluminum hydride is as follows:

(1) Ethylene,
(2) Olefins of the general formula $RCH=CH_2$, e.g., propylene,
(3) Olefins of the general formula $R_2C=CH_2$, e.g., isobutene.

It was found in further studies in the field of this application that this short time-high temperature displacement of higher olefins from higher aluminum alkyls by means of ethylene or its higher homologues proceeds equally smoothly at low and high pressures. In other words, the reaction is substantially independent of the pressure. On the other hand, the short time-high temperature displacement of ethylene from aluminum triethyl by means of propylene, i.e., displacement contrary to the sequence of affinity, proceeds only very difficultly. Even with a molar ratio of aluminum triethyl to propylene of about 1:500, only somewhat less than 30% of the ethyl groups could be displaced with propylene. Naturally, in case of a more favorable molar ratio, still less ethyl groups can be exchanged.

In contrast, when attempting to treat aluminum triethyl with ethylene under a low ethylene pressure of, for example, 1 to 10 atmospheres using somewhat longer residence periods of, for example, 10 to 20 seconds, substantially no newly formed butene-(1) is obtained. When simultaneously increasing the ethylene pressure, large amounts of butene-(1) are obtained, i.e., the addition of ethylene to an Al—C linkage is largely dependent upon the pressure in the temperature range used. The same applies to ethylene homologues.

In accordance with the invention, the co-dimerization of ethylene and propylene comprises allowing a mixture of ethylene and propylene to react under the "short time-high temperature conditions," but only with the use of somewhat more extended residence times with the partial pressure of ethylene being only a fraction of that of propylene. For example, a mixture is used in which the partial pressure of ethylene is 10 atmospheres while that of the propylene is 100 atmospheres. Only very little ethylene is added to Al—C linkages at the low ethylene pressure while propylene, under the relatively high pressure, is added relatively more rapidly to Al—C linkages so that the addition of propylene to aluminum triethyl to form aluminum tripentyl and the subsequent displacement of methyl butene by ethylene proceed in a single step.

On principle, ethylene-propylene mixtures poor in ethylene and aluminum triethyl are invariably used at temperatures of between 220 and 300° C., and residence times of about 5 to 50 seconds. The best ratio of ethylene to propylene ranges between 1:3 and 1:20. The residence time is adjusted such that only part and preferably not more than 80% of the ethylene is reacted. This results in a mixture which consists of about 70% of methyl butene, about 20% of methyl pentene and about 10% of butene in addition to almost pure aluminum triethyl. This reaction takes place repeatedly during a single passage of the aluminum-organic compounds through the reactor so that, for example, the same amount of about 100 kg. of methyl butene which, in two-stage synthesis, required 165 kg. of aluminum triethyl can be produced from 20 kg. of aluminum-organic compound with the use of a single reactor. This doubtlessly represents a considerable economy and simplification from the process engineering and apparatus point of view.

However, it is possible to increase the amount of methyl pentene contained in methyl butene. In case of the embodiment of the invention described above and involving partial conversion of ethylene, the reaction proceeds in a manner such at a certain amount of ethylene is always present until the reaction is completed, i.e., displacement by means of ethylene is always capable of taking place. When choosing different residence periods in a manner such that all of the ethylene has reacted already after the first half of the reaction period or in the middle of a tubular reactor, codimerization of ethylene and propylene will take place during the first half of the reaction or in the first half of the reactor until the ethylene is completely consumed while only dimerization of propylene will take place in the second half of the reaction or of the reactor tube. Suitable for this purpose is a reactor of very considerable length and relatively small diameter so that the reactants pass through the long tube in a plug type flow.

This type of flow is established when the ratio of inside diameter to the length of the tube ranges between 1:500 and 1:10,000, e.g., if this ratio is 1:6,000.

*Example 1*

The reactor used is a steel tube of 6 mm. in inside diameter and 36 m. in length, i.e., of about 1 liter capacity. This steel tube is wound into a coil and embedded in an aluminum block. Means for heating and means for removing the heat of reaction are also included in the aluminum block. The reactants are continuously supplied at one end of the tubular reactor and leave the reactor continuously at the other end of the tube through a throttle valve which permits the reaction to be carried out continuously under any pressure.

40 kg. of an ethylene-propylene mixture (molar ratio, 1:10) and 1 kg. of aluminum triethyl are continuously introduced into this tubular reactor within one hour. The throttle valve at the end of the reactor was adjusted such that a stationary pressure of about 80 atmospheres was prevailing in the reactor. The temperature in the aluminum block was maintained at 270° C. The resultant reaction mixture was first freed from excess ethylene and propylene and then the reaction products proper were separated. The reaction products comprised:

0.4 kg. of pure butene-1,
4.1 kg. of $C_5$ olefin consisting of 84% methyl butene and 16% n-pentene,
0.68 kg. of pure methyl pentene, and
0.06 kg. of higher olefins.

The residue left comprised 1.1 kg. of aluminum trialkyl which mostly consisted of aluminum triethyl, about 6% propyl and very little higher aluminum trialkyls.

The aluminum-organic compound left as the residue was used for another reaction in the same manner as the aluminum triethyl in Example 1 and gave substantially the same result. In this experiment, $C_5$ and $C_6$ olefins were obtained in a ratio of about 6:1. The partial conversion of ethylene was 80%, the residence time about 6 seconds.

*Example 2*

22 kg. of an ethylene-propylene mixture (molar ratio, 1:16) and 0.9 kg. of aluminum triethyl were simultaneously and continuously introduced within 1 hour into the tubular reactor described in Example 1. The throttle valve at the end of the reactor was adjusted such that a stationary pressure of about 150 atmospheres was prevailing in the reactor. The temperature in the aluminum block was maintained at 290° C. The resultant reaction mixture was first freed from excess propylene and then the reaction products proper were separated. There were obtained:

0.26 kg. of pure butene-1,
3.05 kg. of $C_5$ olefin comprising 86% methyl butene and 16% n-pentene-1,
7.5 kg. of pure methyl pentene-1, and
0.11 kg. of higher olefins.

The residue left comprised 1.29 kg. aluminum trialkyl which largely consisted of aluminum tripropyl and very little higher aluminum trialkyls.

In this experiment, $C_5$ and $C_6$ olefins were obtained in a ratio of about 1:2.5. The ethylene introduced into the reactor together with propylene had undergone quantitative conversion. In this experiment, the residence time of the reactants in the reactor was about 25 seconds, i.e., it was about four times that of Example 1. The aluminum trialkyl recovered in this experiment was used for a second reaction in the same manner and gave again substantially the same result, except that the $C_5$ production was somewhat lower (about 2 kg.) while the n-pentene production was not substantially higher, i.e., an exchange of propyl groups on the aluminum for ethyl groups had taken place at the beginning of the reaction. The $C_5$ production was liable to be somewhat lower in the second case because the catalyst itself did not introduce ethyl groups into the reaction in this case.

What I claim is:

1. A process for the dimerization of ethylene and propylene into methyl butene and methyl pentene wherein a dimerization product containing predominantly one of said methyl butene and methyl pentene is produced which comprises contacting a mixture of ethylene and propylene in a ratio of 1:3 to 1:20 with aluminum triethyl as catalyst at a dimerization temperature and pressure of between 220 and 300° C. and about 80 to 150 atmospheres respectively and at a contact time within the range of about 5 to 50 seconds and recovering the dimerization product thereby produced containing predominantly one of said methyl butene and methyl pentene.

2. Process according to claim 1, which comprises effecting said contacting in an elongated reaction zone having the ratio of inner diameter to length of from 1:500 to 1:10,000.

3. Process according to claim 2, which comprises effecting said contacting in an elongated reaction zone having the ratio of inner diameter to length of 1:6,000.

4. Process according to claim 2, which comprises adjusting the contacting time so that all of the ethylene has been reacted at about midpoint of said reaction zone whereby substantially only the dimerization of propylene takes place in the latter part of said reaction zone.

5. Process for the co-dimerization of ethylene and propylene into methyl butene and methyl pentene wherein a co-dimerization product containing predominantly 2-methyl-butene-(1) is produced which comprises contacting a mixture of ethylene and propylene in a ratio of 1:3 to 1:20 with aluminum triethyl as catalyst at a co-dimerization temperature and pressure of between 220 and 300° C. and about 80 to 150 atmospheres respectively and at a contact time within the range of about 5 to 50 seconds at which about 80% of the ethylene has been converted, and recovering the co-dimerization product thereby produced containing predominantly 2-methyl-butene-(1).

6. A process for the co-dimerization of ethylene and propylene into methyl butene and methyl pentene wherein a co-dimerization product containing predominantly methyl butene is produced which comprises contacting a mixture of ethylene and propylene in a ratio of 1:10 with aluminum triethyl as catalyst at a temperature of 270° C. and a pressure of about 80 atmospheres and at a contact time within the range of about 5 to 50 seconds, and recovering the co-dimerization product thereby produced containing predominantly methyl butene.

7. A process for the co-dimerization of ethylene and propylene into methyl butene and methyl pentene wherein a co-dimerization product contain predominantly methyl pentene is produced which comprises contacting a mixture of ethylene and propylene in a ratio of 1:16 with aluminum triethyl as catalyst at a temperature of 290° C. and a pressure of about 150 atmospheres and at a contact time within the range of about 5 to 50 seconds, and recovering the co-dimerization product thereby produced containing predominantly methyl-pentene-(1).

References Cited by the Examiner

UNITED STATES PATENTS 2,699,457   1/1955   Ziegler et al. _____ 260—683.15

FOREIGN PATENTS 876,680   9/1961   Great Britain.

PAUL M. COUGHLAN, Primary Examiner.

ALPHONSO D. SULLIVAN, Examiner.